United States Patent
Sim et al.

(10) Patent No.: US 11,170,759 B2
(45) Date of Patent: Nov. 9, 2021

(54) SYSTEM AND METHOD FOR DISCRIMINATING REMOVING BOILERPLATE TEXT IN DOCUMENTS COMPRISING STRUCTURED LABELLED TEXT ELEMENTS

(71) Applicant: Verint Systems UK Limited, Cambridge (GB)

(72) Inventors: David Alexander Sim, Cambridge (GB); David Paul Austen Ryland, Cambridge (GB)

(73) Assignee: Verint Systems UK Limited, Cambridge (GB)

( * ) Notice: Subject to any disclaimer, the term of this patent is extended or adjusted under 35 U.S.C. 154(b) by 136 days.

(21) Appl. No.: 16/724,960

(22) Filed: Dec. 23, 2019

(65) Prior Publication Data

US 2020/0219481 A1  Jul. 9, 2020

(30) Foreign Application Priority Data

Dec. 31, 2018 (GB) ..................................... 1821327

(51) Int. Cl.
*G10L 13/08* (2013.01)
*G10L 13/047* (2013.01)
(Continued)

(52) U.S. Cl.
CPC ............ *G10L 13/08* (2013.01); *G10L 13/047* (2013.01); *H04L 67/02* (2013.01); *H04L 67/42* (2013.01)

(58) Field of Classification Search
CPC ....... G10L 13/08; G10L 13/047; H04L 67/02; H04L 67/42
See application file for complete search history.

(56) References Cited

U.S. PATENT DOCUMENTS 1,003,692 A 9/1911 Bennet
7,158,961 B1 * 1/2007 Charikar ................. G06F 16/35
(Continued)

FOREIGN PATENT DOCUMENTS

CN 104133870 B 6/2017
EP 1805661 A1 7/2007
(Continued)

OTHER PUBLICATIONS

D. Chakrabarti et al., "Page-level Template Detection via Isotonic Smoothing", pp. 61-70 2007.
G. S. Manku, "Detecting Near-Duplicates for Web Crawling" 2007.

*Primary Examiner* — Wing F Chan
*Assistant Examiner* — Billy H Ng
(74) *Attorney, Agent, or Firm* — Fleit Intellectual Property Law; Jose Gutman

(57) ABSTRACT

A method, system, and computer program product for discriminating boilerplate text in documents, such as web pages. An example method includes: receiving documents structured as labelled text elements; generating a local language model for each labelled text element of the received documents; comparing local language models for different labelled text elements that have the same label; for each comparison of local language models, deriving a similarity indicator, and using the similarity indicators of all the comparisons to derive a similarity score for that label; using the similarity scores to determine labels associated with text elements comprising boilerplate text; and providing the textual content of the labelled text elements to a receiving computer system; and identifying the textual content of labelled text elements that include boilerplate text.

20 Claims, 6 Drawing Sheets

(51) Int. Cl.
*H04L 29/06* (2006.01)
*H04L 29/08* (2006.01)

(56) References Cited

U.S. PATENT DOCUMENTS

| | | |
|---|---|---|
| 9,002,843 B2 | 4/2015 | Itoh et al. |
| 9,449,114 B2 | 9/2016 | Roper et al. |
| 2012/0297025 A1* | 11/2012 | Zeng .................... G06F 16/951 709/217 |
| 2018/0300315 A1* | 10/2018 | Leal ...................... G06F 40/268 |

FOREIGN PATENT DOCUMENTS

| | | |
|---|---|---|
| EP | 2054797 A2 | 5/2009 |
| KR | 101448803 B1 | 10/2014 |
| WO | 2011123981 A1 | 10/2011 |

* cited by examiner

SYSTEM AND METHOD FOR DISCRIMINATING REMOVING BOILERPLATE TEXT IN DOCUMENTS COMPRISING STRUCTURED LABELLED TEXT ELEMENTS

CROSS-REFERENCE TO RELATED APPLICATIONS

This application is based upon and claims priority to UK Patent Application No. 182132 7.2 filed on 31 Dec. 2018, the disclosure of which being hereby incorporated by reference in its entirety.

BACKGROUND

The present invention relates to a system and method for removing boilerplate text in documents comprising structured labelled text elements.

A web page is an example of a document typically structured as labelled elements. The labels are used to generate and display the formatted content of each element.

Many web pages comprise standardize text commonly referred to as boilerplate, for example, navigation menus and legal disclaimers. The content matter of such text is usually different from the primary topic of the page.

In order for search engines to return the most relevant results to a query it is advantageous that they are able to discriminate boilerplate content from the primary content of the page. This is particularly important for site restrictive searches (i.e. a search engine or search request restricted to a single website or relatively small collection of websites), as should a queried term be identified in boilerplate, the search may return every webpage of that website as relevant. Further, site specific searches are less likely to be able to rely on other forms of page ranking available in broader internet search queries that could mitigate this problem.

US2012/0297025 discloses a method of discriminating boilerplate language within a webpage by identifying characteristics of each labelled element (node) within a website containing text, such as: its shape, number of pixels, number of links it contains; and scoring each node based on how similar its characteristics are to that expected in a node comprising boilerplate text.

A problem with this approach is that for many websites the nodes that hold boilerplate text have characteristics resembling nodes holding non-boilerplate text. An example are the legal disclaimers and regulator information found on banking websites which are typically comparable in length to that of the text of the primary topic of the webpage and so are not distinguishable using the method of US2012/0297025.

An alternative approach is described in US2011258528 which identifies the frequency that sentences occur within the website with the intent of disregarding those which occur very frequently as likely to be boilerplate. A problem with this method is that it relies on each page having identical boilerplate language, and so will not filter out boilerplate language that only occurs on a few web pages of the site.

BRIEF SUMMARY

The present invention was conceived with the aim of accurately determining parts of a website comprising boilerplate text so that they are not used by a search engine that for responding to a query.

According to an aspect of the invention there is provided a computer implemented method comprising:
receiving documents structured as labelled text elements from a server;
generating a local language model for each text element of the received documents;
for each label: comparing local language models for text elements having the same label to derive similarity indicators, and using the similarity indictors to derive a similarity score for that label;
using the similarity score to determine labels those elements comprise boilerplate text; and
providing the textual content of the received text elements to a receiving computer system, the determination made in iv) being used to select which text elements to send to the receiving computer system and/or to provide information to the receiving computer system identifying those text elements that comprise boilerplate text.

This method allows for improved identification of boilerplate language in a webpage or other text document. In one embodiment it provides for an improved information retrieval system; the output from v) received by the information retrieval system being used to respond to a query received by the information retrieval system from a user device. Because the comparison is based on the language held in the elements the method is not affected by nature of the non-language characteristics of the elements such as their shape or number of pixels.

Further, because the method compares the language used across all elements with the same label, it is more capable of identifying boilertext that varies between pages on a website as the variation in language between the boilertext elements is likely to be smaller (usually significantly so) than the variation in language between elements of labels that contain the primary content of the website.

Where the receiving system is an information retrieval system it may be favorable that the determination made in iv) is used to select which text elements to send to the information retrieval system as this simplifies the operation of the information retrieval system.

In another embodiment the invention allows for an improved text to speech system, for example, the output provided in v) may be used by the text-to-speech system to select elements in a text document to read out loud. In this embodiment the method may comprise receiving request information including address information of the location of the labelled text elements on a server in order that said labelled text elements can be received.

BRIEF DESCRIPTION OF THE DRAWINGS

The invention will now be described by way of example with reference to the accompanying figures, which together with the detailed description below are incorporated in and form part of the specification, in which.

DETAILED DESCRIPTION

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

Figure 1:
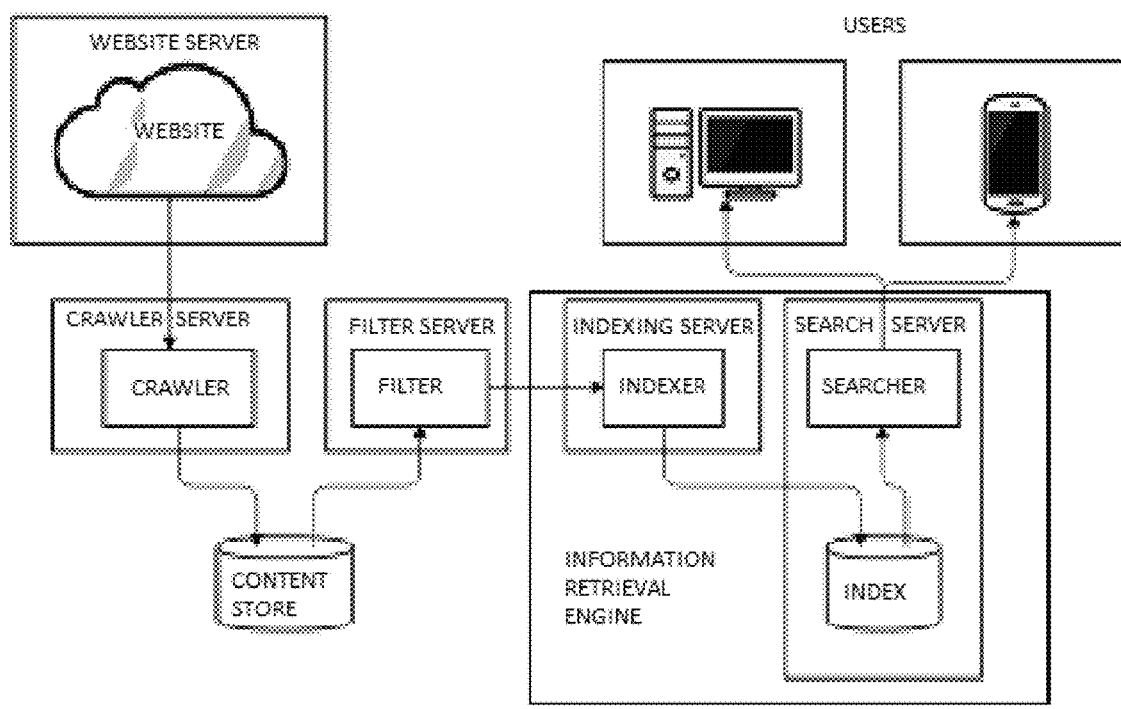
FIG. 1 is a schematic of a system comprising a website, users and search system for discriminating boilerplate text within web pages.

Referring to FIG. 1 there is shown a website held on a remote website server, a crawler server on which runs a crawler program; a content store; a filter server; an information retrieval engine comprising an indexing server implementing an indexer and a search server implementing a searcher and holding an index; and a number of remote users.

The crawler retrieves web pages from the website and stores a copy in the content store. As an example, and not for limitation, a minimum of 2000 web pages of a website are stored for processing according to various embodiments of the novel methods and information processing systems disclosed herein. The crawler stores each page of the website as a collection of labelled elements where each element comprises text. In the context of an HTML website a label will typically be a 'div class' or 'id' and the elements are nodes of the HTML element tree (sometimes referred to as a DOM).

The labels are used by the computer to assemble content of a webpage and according to various embodiments the labels do not form part of the content of a webpage visible to a human.

The filter identifies labels associated with boilerplate text and removes the elements associated with those labels before passing on the remaining website content to the indexer of the informational retrieval engine. The indexer creates a searchable index using the received filtered content, and the searcher responds to queries from the remote users using the index.

Figure 2:
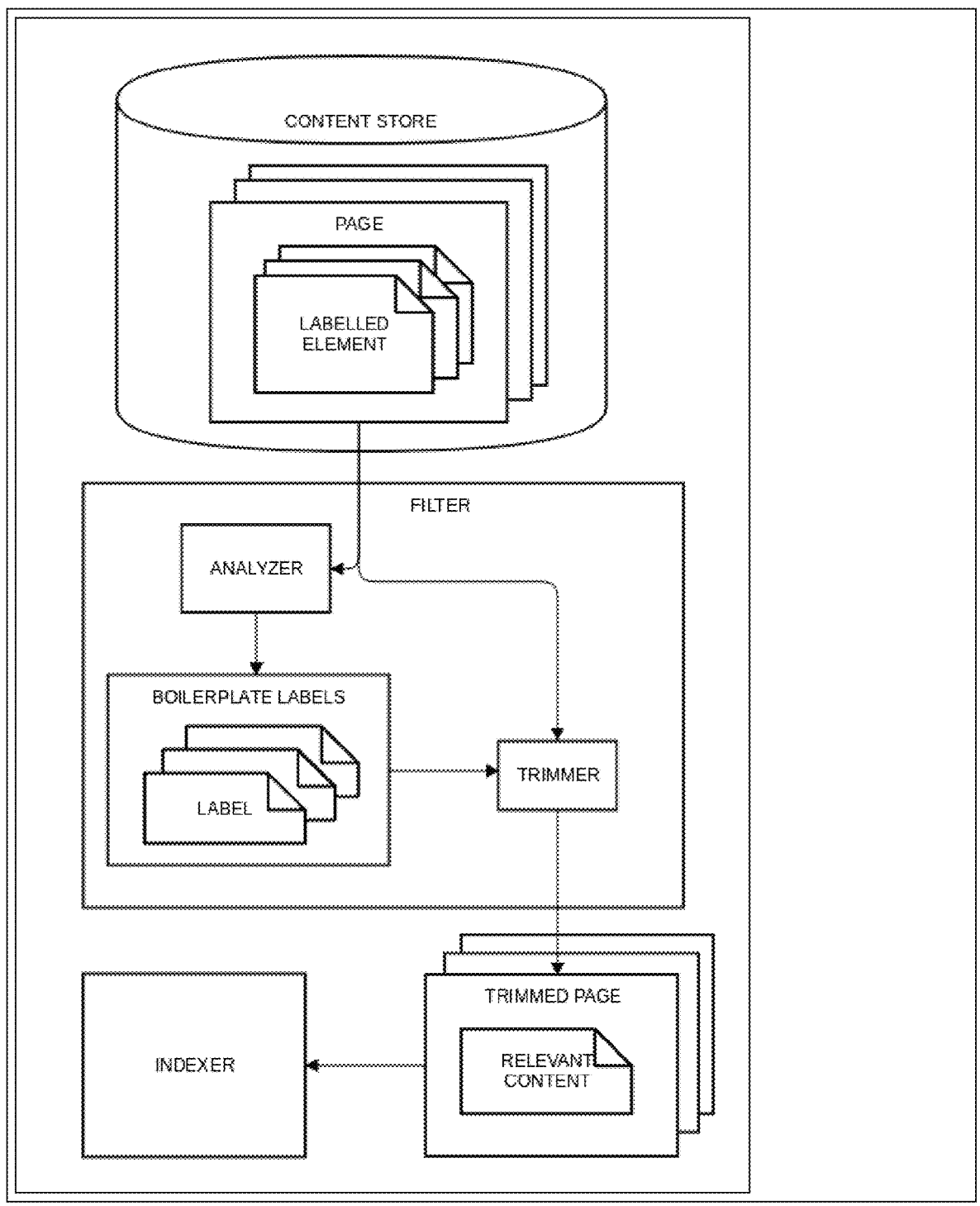
FIG. 2 is a schematic illustrating the functional components of the filter of the search system of FIG. 1.

With reference to FIG. 2, all of the elements of all web pages of the website are passed from the content store (a computer readable memory—in this embodiment a persistent non-volatile computer readable memory) to the analyzer of the filter. The analyzer identifies labels which are likely to correspond to boilerplate text. The analyzer passes on labels identified to correspond to boilerplate text to a trimmer.

The trimmer receives for each page all of the elements for that page and outputs a single text object for each page that comprises the combined text of all elements of the webpage that do not correspond to the labels identified by the analyzer as boilerplate. The outputted text objects are passed onto the indexer.

The indexer uses the outputted objects to create the index of filtered content. The operation of the indexer, and that of the search server in responding to queries from the users (via a computer device typically over the internet), are conventional (e.g. query recommendations results may be sent to and displayed on the user device) other than they are processing content filtered by the filter rather than content derived from whole web pages and so will not be described in further detail.

Figure 3:
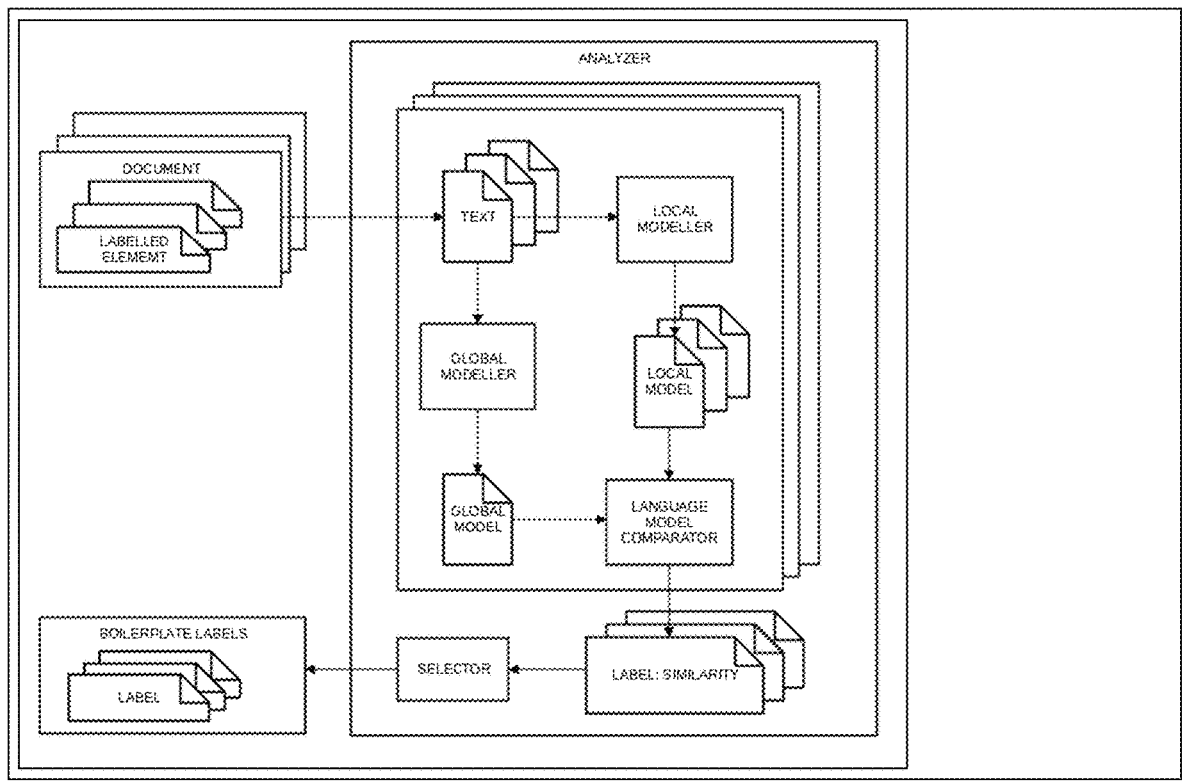
FIG. 3 is a schematic illustrating the functional components of the analyzer of the filter.

The method by which the analyzer discriminates between labels that relate to boilerplate content and those that do not is described further with reference to FIG. 3.

For each label the analyzer:

generates a local language model for the text of each element of the website associated with the label; and generates a global language model from the combined text of all elements of the website associated with the label.

A preferred language model is the standard Bag-of-Words model but other language models such as, for example, Smoothed N-grams, e.g. Smoothed Bigrams can used instead. The construction of these models is taught in Application of Speech and Language Processing Daniel Jurafsky & James H Martin ISBN 978-0-13-504196-3 (Chapter 4).

Each model (local or global) indicates probability distribution of individual words and/or short phrases in the associated text.

Where the content store comprises web pages from multiple websites, the system relies on each website using unique label names, i.e. the same label is unlikely to be used by two different websites in relation to elements relating to different types of content.

Figure 4:
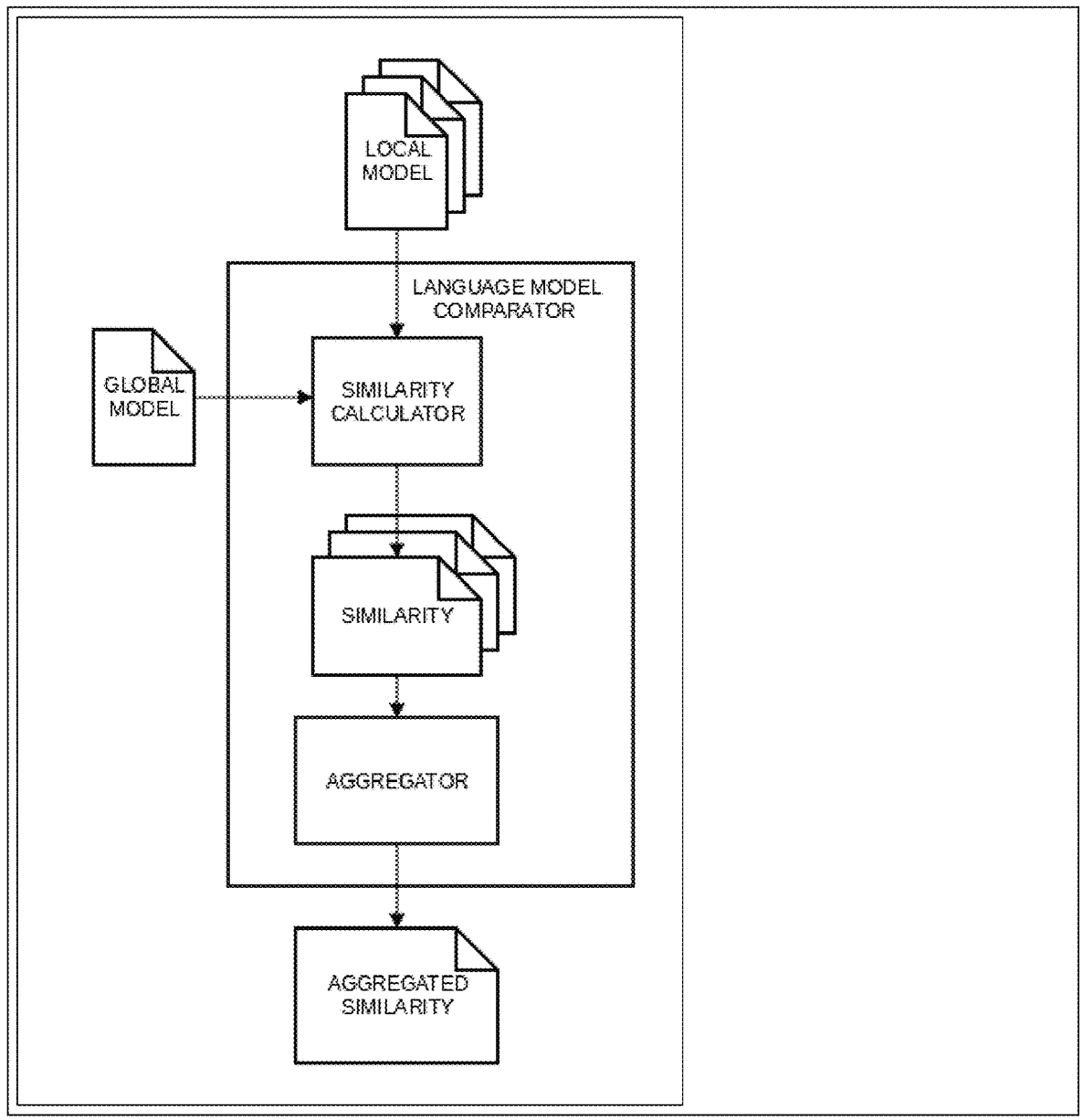
FIG. 4 is a schematic illustrating the functional components of the language model comparator of analyzer of FIG. 4.

As illustrated in FIG. 4, the language model comparator comprises a similarity calculator that compares each instance of the local model for a label with the global model for that label and outputs a similarity score so as to produce a set of similarity scores for a label, one for each local model.

In this example, the similarity score is a cross-entropy score but other indicators of similarity could be used such as, for example, Jaccard Distance or Kullback Leibler divergence.

The set of similarity scores are aggregated by an aggregator which outputs an aggregated similarity score for the label. There are a number of methods to aggregate, examples include calculating the mean, truncated mean, or median similarity score of the set of similarity scores. The aggregate similar score provides an indication of the similarity of the text across all elements with the same label.

This process is repeated for all labels to provide a set of aggregated similarity scores.

A selector selects labels having an aggregated similarity score above a threshold and outputs these as label as corresponding to boilerplate text by virtue that a high similarity score is indicative that each element with that label contains relatively similar text whereas labels with relatively low similarity scores are associated with text elements that have relative dissimilar text implying that they relate to the primary topic of the webpage.

Figure 5:
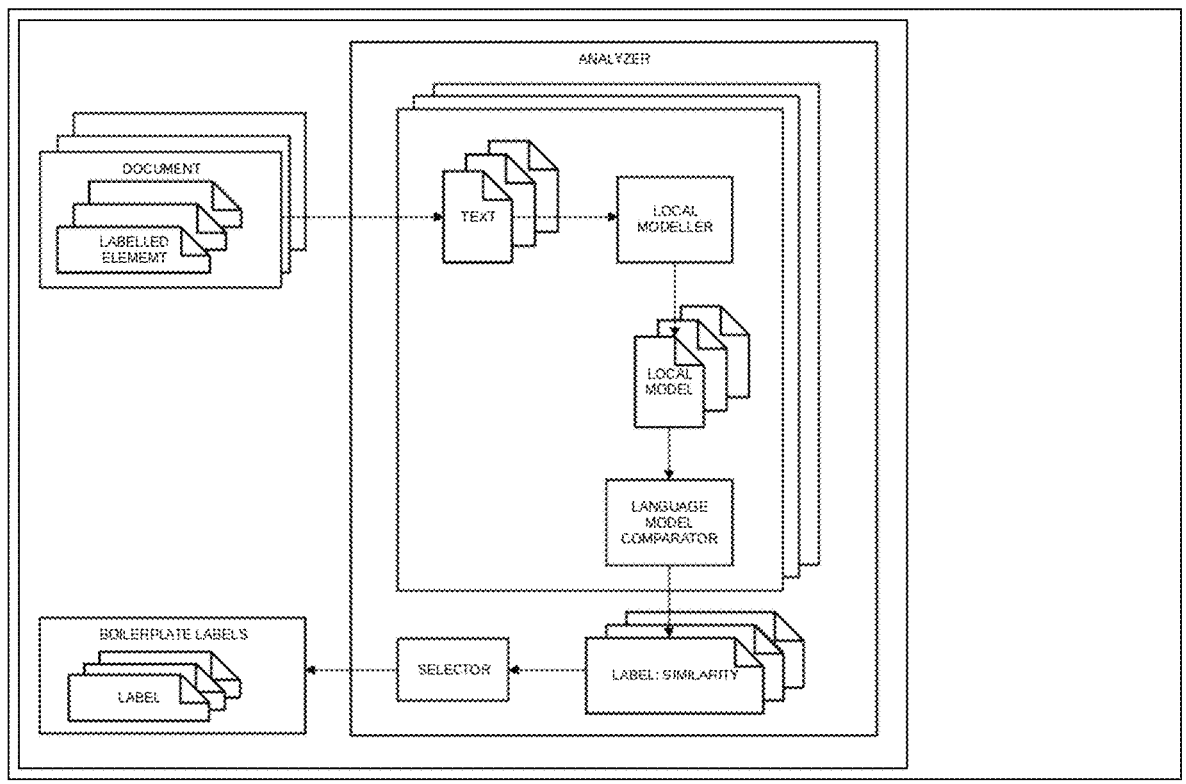
FIG. 5 is a schematic illustrating the functional components of a variant analyzer.

FIG. 5 illustrates an alternative implementation of analyzer. For each label the local modeler of the analyzer of FIG. 5 generates a local language model for the text of each element associated with the label.

As before, each model indicates the probability distribution of individual words and/or short phrases in the associated text.

Figure 6:
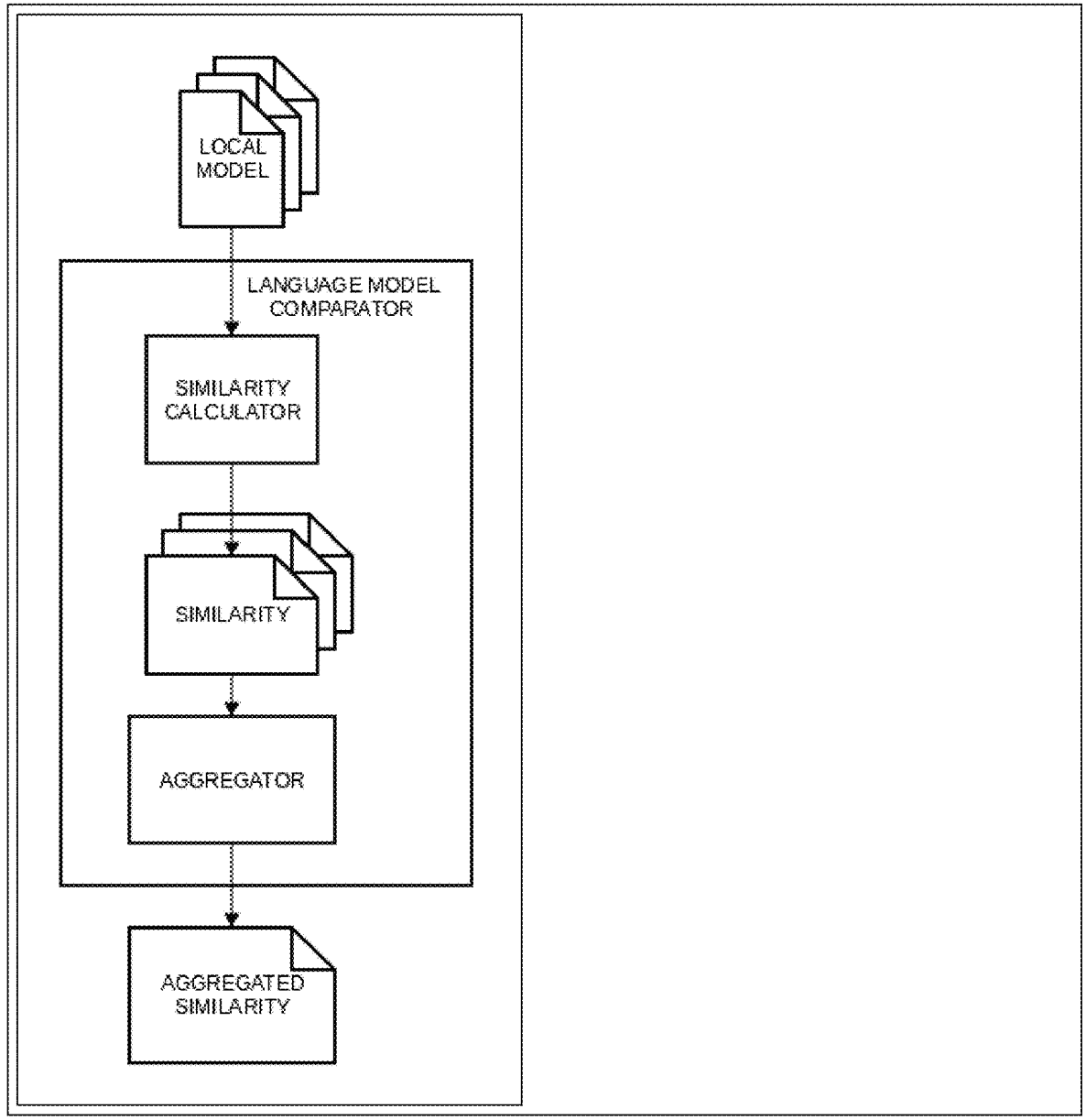
FIG. 6 is a schematic illustrating the functional components of the language model comparator of analyzer of FIG. 5.

With reference FIG. 6, the language model comparator comprises a similarly calculator that compares each local language model with every other local language model for that label, outputting a similarity score for each comparison.

As before, the similarity score is a cross-entropy score but other indicators of similarity could be used such as for example Jaccard Distance or Kullback Leibler divergence.

The set of similarity scores are aggregated by an aggregator which outputs an aggregated similarity score for the label. The aggregator can use any of the aggregation methods mentioned in relation of the aggregator of FIG. 4.

This process is repeated for all labels to provide a set of aggregated similarity scores.

A selector selects labels having an aggregated similarity score above a threshold and outputs these as labels corresponding to boilerplate text.

The selector may instead or in addition select labels by comparing the aggregated similarity scores for all labels e.g. of a website and select those that have relatively high scores compared with the others.

Although the invention has been described with reference to a web crawler and text elements making up web pages from a website, the invention may be used to improve search systems used for searching documents other than web pages, e.g. a collection of HTML, XML or similarly structure documents (e.g. emails and Microsoft Word documents which can be represented in XML format) in a file system or database on a LAN or WAN). In such instances the system need only be able to receive said documents and so may omit the web crawler.

An information retrieval system may comprise a search system, e.g. a crawler, indexer and searcher; question answering service, e.g. a Watsom Wolfram engine.

Alternatively the output of the filter may be passed to a document clustering service, text-to-speech system or any services which relies on being able to discriminate content for retrieval. In the case of a text-to-speech system the output of the filter may be used to discriminate boilerplate language on a webpage or other text document in order that reading out loud of boilerplate text can be avoided unless desired. In such an example, the text-to-speech system may pass on text documents to be filtered to the content store and/or filter and thus the web crawler can be omitted.

The present subject matter can be realized in hardware or a combination of hardware and software. Specifically each of the remote website server, crawler server; filter server; and information retrieval engine can each be realized by separate hardware or a separate combination of hardware and software that communicate with one another through one or more communication networks such as a local area network (LAN), a general wide area network (WAN), and/or a public network (e.g., the Internet)

Any kind of computer system—or other apparatus adapted to implement the functional features and for carrying out the methods of the filter described herein—is suitable. A typical combination of hardware and software could be a general purpose computer system with a computer program that, when being loaded and executed, controls the computer system such that it carries out the functions of the filter as described above.

The present subject matter can be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a conversion to another language, code or, notation; and b reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory ROM, flash memory, disk drive memory, CD-ROM, and other permanent storage. Additionally, a computer medium may include volatile storage such as RAM, buffers, cache memory, and network circuits. Furthermore, in certain embodiments of the computer readable medium, other than a computer readable storage medium as discussed above, the computer readable medium may comprise computer readable information in a transitory state medium such as a network link and/or a network interface, including a wired network or a wireless network, that allow a computer to read such computer readable information.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A computer implemented method comprising:
   i) receiving from a server, documents structured as labelled text elements;
   ii) generating a local language model for each labelled text element of the received documents;
   iii) comparing local language models for different labelled text elements that have the same label;
   iv) for each comparison of local language models in iii), deriving a similarity indicator, and using the similarity indicators of all the comparisons to derive a similarity score for that label;
   v) using similarity scores to determine labels associated with text elements comprising boilerplate text; and
   vi) providing textual content of the labelled text elements to a receiving computer system, the determination made in v) being used to: provide the textual content of selected labelled text elements to the receiving computer system and/or to provide information to the receiving computer system identifying the textual content of labelled text elements that comprise boilerplate text.

2. The computer implemented method according to claim 1 wherein the receiving computer system comprises an information retrieval system.

3. The computer implemented method according to claim 2 wherein the textual content provided in vi) and received by the information retrieval system is used to populate an index of the information retrieval system.

4. The computer implemented method according to claim 1 wherein the receiving computer system is a text to speech system.

5. The computer implement method according to claim 1 further comprising:
   vii) generating a global language model from combined text of all text elements having the same label; and
   viii) repeating vii) for each label to provide a global language model for each label; and wherein iii) comprises: comparing the local language model for each text element with the global language model for that label to derive a similarity indicator for each local language model.

6. The computer implemented method according to claim 1, wherein iii) comprises: comparing the local language model for each text element with other local language models for other text elements with the same label to derive, for each comparison, a similarity indicator.

7. The computer implemented method according to claim 1 where iv) comprises: averaging the similarity indicators for a label to derive the similarity score for the label.

8. The computer implemented method according to claim 1 wherein the similarity score for a label is indicative of similarity of text between the elements of that label.

9. The computer implemented method according to claim 1 wherein v) comprises comparing the similarity scores for labels with a threshold.

10. The computer implemented method according to claim 1 comprising comparing similarity scores of different labels to determine one or more labels which from relative similarity score compared to other labels, are associated with text elements that comprise text which is relatively similar to other elements of that label.

11. The computer implemented method according to claim 1 wherein the local language model is a probabilistic model.

12. The computer implemented method according to claim 1 wherein the documents are web pages of a website.

13. The computer implemented method according to claim 12, wherein the documents are a minimum of 2000 web pages of a website.

14. A system comprising:
   a computer, and a computer readable medium coupled to the computer having instructions stored thereon which, when executed by the computer cause the computer to perform operations comprising:
   i) receiving documents structured as labelled text elements from a server;
   ii) generating a local language model for each text element of the received documents;
   iii) comparing local language models for different text elements having the same label to derive similarity indicators, and using the similarity indictors to derive a similarity score for that label;
   iv) using the similarity score to determine labels whose elements comprise boilerplate text; and
   v) passing to an information retrieval system indicators of the labels determined in iv) above whose elements comprise boilerplate text.

15. A computer program product for a processing system comprised of a computer, the computer program product comprising a non-transitory computer readable storage medium having computer readable program code embodied therewith, the computer readable program code including computer instructions, where a processor, responsive to executing the computer instructions, performs operations comprising:
   i) receiving documents structured as labelled text elements from a server;
   ii) generating a local language model for each text element of the received documents;
   iii) comparing local language models for different text elements having the same label to derive similarity indicators, and using the similarity indictors to derive a similarity score for that label;
   iv) using the similarity score to determine labels whose elements comprise boilerplate text; and
   v) passing to an information retrieval system indicators of thorn the labels determined in iv) above whose elements comprise boilerplate text.

16. The computer program product of claim 15 wherein the operations further comprise:
   vi) generating a global language model from combined text of all text elements having the same label; and
   vii) repeating vii) for each label to provide a global language model for each label; and
   wherein iii) comprises: comparing the local language model for each text element with the global language model for that label to derive a similarity indicator for each local language model.

17. The computer program product of claim 15 wherein the operations further comprise:
  comparing the local language model for each text element with other local language models for other text elements with the same label to derive, for each comparison, a similarity indicator.

18. The computer program product of claim 15 wherein the operations further comprise:
  averaging the similarity indicators for a label to derive the similarity score for the label.

19. The computer program product of claim 15 wherein iv) comprises comparing similarity scores for labels with a threshold.

20. The computer program product of claim 15 wherein the operations further comprise:
  comparing similarity scores of different labels to determine one or more labels which from relative similarity score compared to other labels, are associated with text elements that comprise text which is relatively similar to other elements of that label.

\* \* \* \* \*